United States Patent
Chaiken et al.

(10) Patent No.: US 11,314,578 B2
(45) Date of Patent: Apr. 26, 2022

(54) INFORMATION HANDLING SYSTEM AND METHOD TO DETECT AND RECOVER FROM SPURIOUS RESETS OF PCIE DEVICES

(71) Applicant: DELL PRODUCTS L.P., Round Rock, TX (US)

(72) Inventors: Craig L. Chaiken, Pflugerville, TX (US); Michael W. Arms, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 16/294,587

(22) Filed: Mar. 6, 2019

(65) Prior Publication Data

US 2020/0285534 A1  Sep. 10, 2020

(51) Int. Cl.
G06F 11/07  (2006.01)
G06F 13/42  (2006.01)

(52) U.S. Cl.
CPC ...... *G06F 11/0793* (2013.01); *G06F 11/0745* (2013.01); *G06F 11/0751* (2013.01); *G06F 13/4282* (2013.01); *G06F 2213/0026* (2013.01)

(58) Field of Classification Search
CPC ......... G06F 2213/0026; G06F 13/4282; G06F 11/0745; G06F 11/1793; G06F 11/0751
See application file for complete search history.

(56) References Cited

U.S. PATENT DOCUMENTS

| | | | | |
|---|---|---|---|---|
| 8,880,747 B2* | 11/2014 | Bolen | ................ | G06F 13/4081 710/8 |
| 10,229,017 B1* | 3/2019 | Zou | ..................... | G06F 11/2007 |
| 10,437,495 B1* | 10/2019 | Michaud | .............. | G06F 9/4401 |
| 2002/0124207 A1* | 9/2002 | Ohwada | ............. | G06F 11/0772 714/36 |
| 2007/0124542 A1* | 5/2007 | Ven | ..................... | G06F 12/0804 711/143 |

(Continued)

OTHER PUBLICATIONS

Kwa et al., "PCI Express Architecture Power Management", Rev. 1.1., Intel White Paper, 2002, 15 pgs.

*Primary Examiner* — Matthew M Kim
*Assistant Examiner* — Matthew N Putaraksa
(74) *Attorney, Agent, or Firm* — Egan, Enders & Huston LLP.

(57) ABSTRACT

Embodiments of information handling systems (HSs) and computer-implemented methods are provided herein to detect and recover from spurious PCIe device resets. One embodiment of a disclosed method is performed by a host processor of an IHS that includes a plurality of Peripheral Component Interconnect Express (PCIe) devices, each including a set of PCIe configuration registers containing configuration settings for the PCIe device. The disclosed method includes generating, in response to the IHS transitioning from a lower power state to a higher power state, a PCIe device table containing the configuration settings stored within the set of PCIe configuration registers for each of the PCIe devices; determining, in response to detecting a system management interrupt (SMI), whether or not a spurious reset has occurred for at least one of the PCIe devices; and recovering the at least one PCIe device if said determining indicates that a spurious reset has occurred for the at least one PCIe device.

18 Claims, 6 Drawing Sheets

(56) References Cited

U.S. PATENT DOCUMENTS

| | | | |
|---|---|---|---|
| 2009/0158069 A1* | 6/2009 | Oh | G06F 1/3203 |
| | | | 713/323 |
| 2009/0210607 A1* | 8/2009 | Hanscom | G06F 11/1441 |
| | | | 710/315 |
| 2010/0251014 A1* | 9/2010 | Yagi | G06F 11/1441 |
| | | | 714/5.11 |
| 2012/0005464 A1* | 1/2012 | Tanaka | G06F 9/4401 |
| | | | 713/1 |
| 2013/0159581 A1* | 6/2013 | Kegel | G06F 13/24 |
| | | | 710/267 |
| 2015/0089287 A1* | 3/2015 | Jayakumar | G06F 12/0802 |
| | | | 714/23 |
| 2015/0205972 A1* | 7/2015 | Huang | G06F 21/6218 |
| | | | 726/27 |
| 2015/0370665 A1* | 12/2015 | Cannata | G06F 11/2069 |
| | | | 714/4.11 |
| 2016/0283433 A1* | 9/2016 | Nair | G06F 13/4068 |
| 2016/0292075 A1* | 10/2016 | Mohan | G06F 12/1036 |
| 2017/0068607 A1* | 3/2017 | Herzi | G06F 13/24 |
| 2017/0091135 A1* | 3/2017 | Cardinell | G06F 13/385 |
| 2017/0123987 A1* | 5/2017 | Cheng | G06F 15/7821 |
| 2017/0286318 A1* | 10/2017 | Brannock | G06F 12/1009 |
| 2017/0337069 A1* | 11/2017 | Huang | G06F 11/221 |
| 2018/0321948 A1* | 11/2018 | Vaquero | G06F 11/3051 |
| 2019/0332391 A1* | 10/2019 | Ndu | G06F 9/4406 |
| 2020/0103932 A1* | 4/2020 | Sanghi | G06F 1/324 |
| 2020/0310933 A1* | 10/2020 | Zhu | G06F 11/0793 |
| 2021/0026797 A1* | 1/2021 | Barbiero | G06F 13/40 |
| 2021/0240561 A1* | 8/2021 | Shah | G06F 11/0745 |

\* cited by examiner

115

| 31 | | 16 15 | | 0 | |
|---|---|---|---|---|---|
| Device ID | | | Vendor ID | | 00h |
| Status | | | Command | | 04h |
| Class Code | | | | Revision ID | 08h |
| BIST | Header Type | Lat. Timer | | Cache Line S. | 0Ch |
| Base Address Registers | | | | | 10h |
| | | | | | 14h |
| | | | | | 18h |
| | | | | | 1Ch |
| | | | | | 20h |
| | | | | | 24h |
| Cardbus CIS Pointer | | | | | 28h |
| Subsystem ID | | | Subsystem Vendor ID | | 2Ch |
| Expansion ROM Base Address | | | | | 30h |
| Reserved | | | | Cap. Pointer | 34h |
| Reserved | | | | | 38h |
| Max Lat. | Min Gnt. | Interrupt Pin | | Interrupt Line | 3Ch |

FIG. 3

INFORMATION HANDLING SYSTEM AND METHOD TO DETECT AND RECOVER FROM SPURIOUS RESETS OF PCIE DEVICES

FIELD

This invention relates generally to information handling systems (IHSs), and more particularly, to IHSs that include Peripheral Component Interconnect Express (PCIe) devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems (IHSs), such as servers, desktop computers and mobile PCs, include Peripheral Component Interconnect Express (PCIe) interfaces and ports for connecting and communicating with PCIe-compatible devices, such as video cards, sound cards, network interface cards (NICs), hardware RAID controllers, solid state drives (SSDs), GPUs, etc. In the PCIe bus architecture, PCIe devices are connected via a network of serial connections called links. A PCIe link is a point-to-point communication channel between two PCIe ports and includes one or more lanes. Each lane is composed of two differential signal pairs, one for receiving data and the other for transmitting data. Due to the serial, point-to-point connection between devices and the simultaneous, bi-directional signaling across lanes, the PCIe bus architecture is much faster than other bus architectures, such as PCI, PCI-X and AGP.

Faster signaling rates enables processing components of PCIe devices and other IHS components to operate at faster processing speeds, which increases power consumption in an information handling system. One method for reducing power consumption is to place PCIe devices and other IHS components in an idle or low power state during periods of inactivity. For example, the Advanced Configuration and Power Interface (ACPI) is an open standard that operating systems can use to manage power consumption in an information handling system. The latest version of the ACPI specification can be found on the Unified Extensible Firmware Interface (UEFI) Forum website (http://uefi.org/specifications).

The ACPI specification defines six sleep "Sx" states and five device "Dx" states that can be used to reduce power consumption within an IHS. The six sleep "Sx" states are applied to the system platform, and include "S0" (working), "S1" (Power on Suspend: host processor stops executing, but power to host processor and system memory is maintained), "S2" (power removed from host processor), "S3" (standby or sleep mode; power to system memory maintained), "S4/S5" (system powered down). The five device states are device dependent and include "D0" (working), "D1/D2" (intermediate power states defined by device), "$D3_{hot}$" (auxiliary power supplied to device) and "$D3_{cold}$" (device powered down). In general, power consumption can be reduced in an ACPI-compliant information handling system by transitioning the system platform to lower power Sx states (e.g., S1-S5) and/or by transitioning individual devices to lower power Dx states (e.g., D1-D3).

In addition to the power management features provided by ACPI, the PCI Express Base Specification defines an Active State Power Management (ASPM) protocol, which reduces power consumption in the PCIe links connecting PCIe devices when the devices are fully active (e.g., in a D0 state) and when the devices are placed in a lower power state (e.g., in a D1-D3 state). Details of the ASPM protocol can be found in the latest version of the PCI Express Base Specification (currently Revision 4.0, Version 1.0, dated Oct. 5, 2017), which may be obtained from the PCI-SIG website (https://pcisig.com/specifications).

The ASPM protocol defines a number of power management states or "link states" (e.g., L0, L0s, L1, L2, L3) for PCIe links. When a PCIe device is fully active, power consumption may be reduced by transitioning the PCIe link to an L0s or L1 link state during short periods of device inactivity. Power savings are realized in the L0s/L1 states by shutting down certain link components, such as the transceiver circuitry, clock gating of the PCIe logic and the PLL included within the PCIe port. If a PCIe device is placed in a low power state, additional power savings can be achieved by transitioning the PCIe link to an L2 or L3 link state. When a PCIe device is in $D3_{hot}$ and preparing to enter $D3_{cold}$, the PCIe link is placed in the L2 link state to prepare the PCIe link for removal of power and clock. Once the PCIe device enters $D3_{cold}$, the PCIe link is transitioned to the L3 link state and power and clock are removed. To bring a PCIe device and its link back up from the $D3_{cold}$/L3 states, the system platform must go through a boot sequence to reapply power, clock and reset.

In some cases, a PCIe device may fail to correctly transition in and out of a lower power state when ASPM is enabled. When this occurs, the PCIe device is automatically reset (referred to as a "spurious reset") and the configuration settings stored within the PCIe device are reset to power-on defaults. Although the PCIe device is still present on the PCIe bus, the device driver running in the operating system cannot access the device resources when a spurious reset occurs and the configuration settings are reset. When the device driver attempts to access a PCIe device that has been reset, a timeout error may occur, resulting in a system hang, Blue Screen of Death (BSOD) error and data loss. Although such errors occur at relatively low frequency, virtually every system having PCIe devices has experienced this failure. If the failure rate for a PCIe device becomes objectionable, the common practice is to disable ASPM support for the device. However, this is often undesirable, since it increases power usage.

SUMMARY OF THE INVENTION

The following description of various embodiments of information handling systems and related methods is not to be construed in any way as limiting the subject matter of the appended claims.

According to another embodiment, a computer-implemented method is provided herein for detecting and recovering from a spurious PCIe device resets. The disclosed method may be performed by a host processor of an information handling system (IHS) comprising a plurality of Peripheral Component Interconnect Express (PCIe) devices, each PCIe device comprising a set of PCIe configuration registers containing configuration settings for the PCIe device. In general, the computer-implemented method may include generating, in response to the IHS transitioning from a lower power state to a higher power state, a PCIe device table containing the configuration settings stored within the set of PCIe configuration registers for each of the PCIe devices, determining, in response to detecting a system management interrupt (SMI), whether or not a spurious reset has occurred for at least one of the PCIe devices, and recovering the at least one PCIe device if said determining indicates that a spurious reset has occurred for the at least one PCIe device. In some embodiments, the at least one PCIe device may be recovered by using the configuration settings stored within the PCIe device table to restore the configuration settings stored within the set of PCIe configuration registers included within the at least one PCIe device.

In some embodiments, the computer-implemented method may perform one or more additional steps prior to said determining. In one example, the computer-implemented method may include detecting an SMI that is triggered when a timeout error occurs in a particular PCIe device. In such an example, the determining step may determine that a spurious reset has occurred for the particular PCIe device when the SMI is detected. In another example, the computer-implemented method may include detecting an SMI that is triggered periodically via SMI polling. In such an example, the determining step may include reading the configuration settings stored within the PCIe device table for each PCIe device, and determining that a spurious reset has occurred for at least one PCIe device if the configuration settings stored within the PCIe device table for the at least one PCIe device indicate that a command register is disabled when the at least one PCIe device is in a working state.

In some embodiments, the computer-implemented method include disabling Active State Power Management (ASPM) support for at least one PCIe device if the determining step indicates that a spurious reset has occurred for the at least one PCIe device. In some embodiments, the computer-implemented method include re-enabling ASPM support for the at least one PCIe device on a subsequent reboot of the information handling system.

According to one embodiment, an information handling system (IHS) is provided herein including a plurality of Peripheral Component Interconnect Express (PCIe) devices, each comprising a set of PCIe configuration registers containing configuration settings for the PCIe device, and a host processor which is coupled to the PCIe devices and configured to execute program instructions. For example, the host processor may be configured to execute a first set of program instructions in response to the IHS transitioning from a lower power state to a higher power state, a second set of program instructions to determine if a spurious reset has occurred for at least one of the PCIe devices, and a third set of program instructions to recover the at least one PCIe device if the second set of program instructions determine that a spurious reset has occurred for the at least one PCIe device.

The first set of program instructions may be executed by the host processor to generate a PCIe device table containing the configuration settings stored within the PCIe configuration registers for each of the plurality of PCIe devices. In some embodiments, the first set of program instructions may be executed by the host processor whenever a system platform of the IHS transitions from an S1-S5 state to an S0 state. In other embodiments, the first set of program instructions may be executed by the host processor in response to an interceptable event that occurs when an operating system (OS) of the IHS is booted. Examples of interceptable events are those that occur early in the OS boot process such as, e.g., when the operating system initializes battery capacity, or when ACPI initializes an ASL variable.

The second set of program instructions may be executed by the host processor in response to detecting a system management interrupt (SMI). In some embodiments, the second set of program instructions executed by the host processor may determine that a spurious reset has occurred for a particular PCIe device if the SMI is triggered in response to a timeout error that occurs in the particular PCIe device. For example, the plurality of PCIe devices may include at least one PCI-to-PCI bridge, and the SMI may be triggered by a non-maskable interrupt (NMI), which is generated by the at least one PCI-to-PCI bridge when a timeout error occurs in a PCIe device connected to the at least one PCI-to-PCI bridge. In other embodiments, the second set of program instructions may be executed by the host processor in response to an SMI that is triggered periodically via SMI polling. In such embodiments, the second set of program instructions may be executed by the host processor to read the configuration settings stored within the PCIe device table for each PCIe device, and determine that a spurious reset has occurred for at least one PCIe device, if the configuration settings stored within the PCIe device table for the at least one PCIe device indicate that a command register is disabled when the at least one PCIe device is in a working state.

If the second set of program instructions determine that a spurious reset has occurred for at least one PCIe device, the third set of program instructions may be executed by the host processor to recover the at least one PCIe device. In some embodiments, the third set of program instructions may use the configuration settings stored within the PCIe device table to restore the configuration settings stored within the set of PCIe configuration registers included within the at least one PCIe device.

In some embodiments, the host processor may execute a fourth set of program instructions to disable Active State Power Management (ASPM) support for the at least one PCIe device for the current operating cycle, and a fifth set of program instructions to re-enable ASPM support for the at least one PCIe device on a subsequent reboot of the information handling system.

The first, second, third, fourth and fifth program instructions may generally be stored within a computer readable non-volatile (NV) memory of the information handling system. In some embodiments, the first, second, third, fourth and fifth sets of program instructions may be program instructions included within boot firmware and System Management Mode (SMM) program code.

BRIEF DESCRIPTION OF THE DRAWINGS

Other advantages of the present disclosure will become apparent upon reading the following detailed description and upon reference to the accompanying drawings in which:

FIG. 3 is a block diagram illustrating a set of PCIe configuration registers that may be included within a PCIe device to specify configuration settings for the PCIe device;

Figure 1:
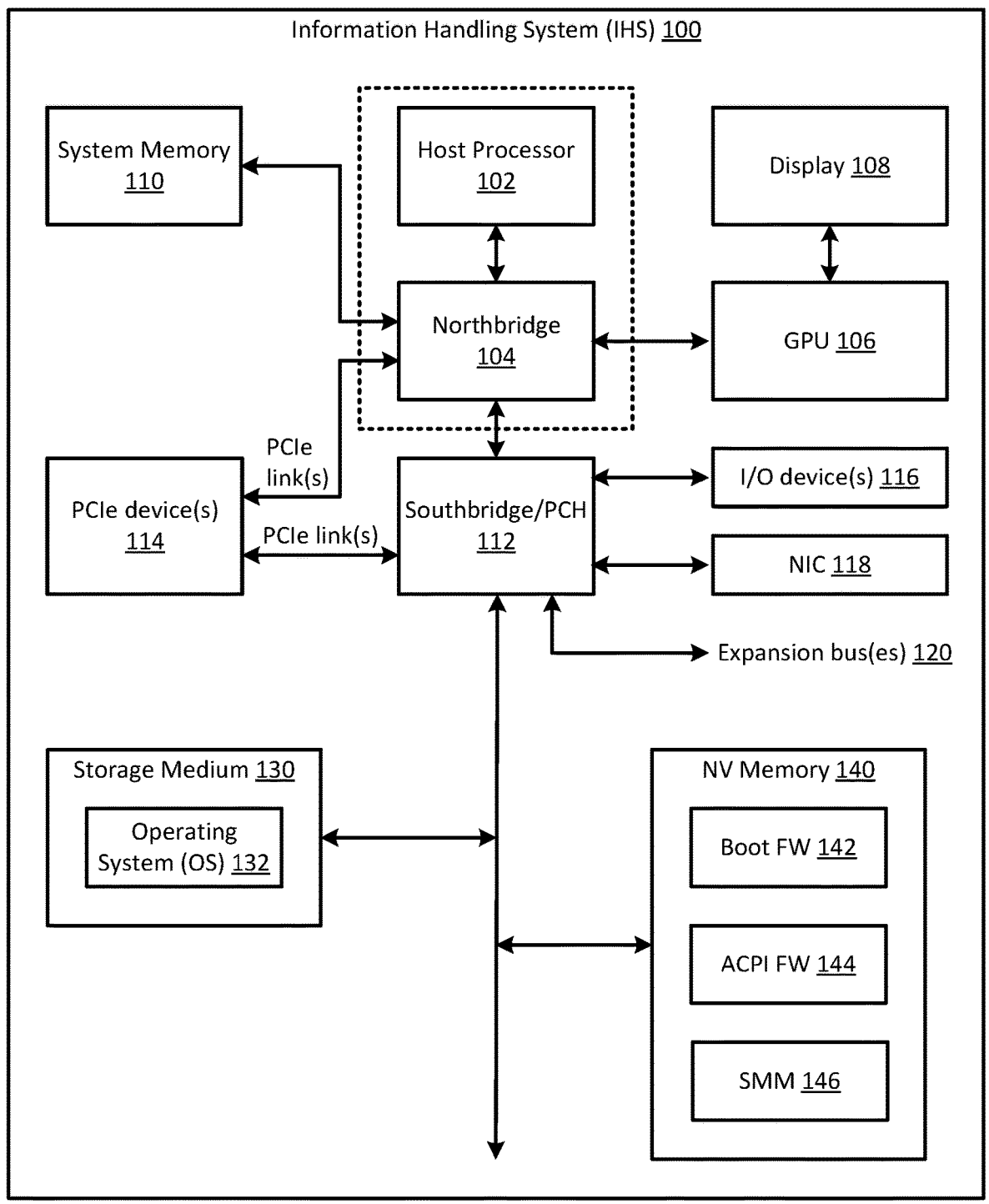
FIG. 1 is a block diagram illustrating one embodiment of an information handling system (IHS) including a processing device and a plurality of Peripheral Component Interconnect Express (PCIe) devices in accordance with the present disclosure.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

FIG. 1 is a block diagram of an information handling system (IHS) 100 as it may be configured according to one embodiment of the present disclosure. As shown in FIG. 1, IHS 100 may generally include a host processor 102 and a plurality of Peripheral Component Interconnect Express (PCIe) device(s) 114. In addition, IHS 100 may include other components, such as northbridge controller 104, graphics processor unit (GPU) 106, display device 108, system memory 110, southbridge controller 112, input/output (I/O) devices 116, network interface card (NIC) 118, expansion bus(es) 120, computer readable storage medium 130, and computer readable non-volatile (NV) memory 140.

It is expressly noted that the IHS configuration shown in FIG. 1 is exemplary only, and that the methods disclosed herein may be implemented on any type and/or configuration of information handling system having a processing device and a plurality of PCIe devices. It will be further understood that while certain components of the information handling system are shown in FIG. 1 for illustrating embodiments of the present disclosure, the information handling system disclosed herein is not restricted to including only those components shown in FIG. 1 and described below.

Host processor 102 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 102 may include at least one central processing unit (CPU) having one or more processing cores. The CPU may include any type of processing device, such as an Intel Pentium series processor, an Advanced Micro Devices (AMD) processor or another processing device. In some embodiments, host processor 102 may include other types of processing devices including, but not limited to, a graphics-derivative processor (such as a physics/gaming processor), a digital signal processor (DSP), etc.

Northbridge controller 104 is coupled to host processor 102 and configured to coordinate communication between host processor 102 and one or more IHS components. In the embodiment shown in FIG. 1, northbridge controller 104 is coupled to GPU 106 and system memory 110. Although illustrated as a separate component in FIG. 1, northbridge controller 104 may alternatively be integrated into host processor 102, for example, when host processor 102 is implemented as a silicon-on-chip (SoC) processor. In some embodiments, a number of PCIe links may be coupled to northbridge controller 104 for communicating with one or more PCIe devices, such as a PCIe GPU and/or a PCIe solid-state drive (SSD).

GPU 106 is configured to coordinate communication between the host processor/northbridge controller and one or more display components of the IHS. In the embodiment shown in FIG. 1, for example, GPU 106 is coupled to display device 108 to provide visual images to the user. Display device 108 may be a display screen embedded within the chassis of the IHS, or an external display screen or monitor coupled to the IHS. In some embodiments, GPU 106 may be further coupled to one or more display ports to support additional display functions for the IHS.

In the embodiment shown in FIG. 1, GPU 106 is illustrated as a separate integrated circuit chip, which is coupled to northbridge controller 104 via a bus. In another embodiment, GPU 106 may be integrated with host processor 102 and northbridge controller 104 when host processor 102 is implemented as a silicon-on-chip (SoC) processor. In yet another embodiment, GPU 106 may be implemented as a PCIe device, which communicates with host processor 102 via a PCIe link coupled, for example, to a PCIe bridge on northbridge controller 104 or southbridge controller 112.

System memory 110 is coupled to northbridge controller 104 and generally configured to store program instructions, which are executable by host processor 102. System memory 110 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

In some embodiments, southbridge controller 112 may be coupled to northbridge controller 104 via an internal bus. In other embodiments, southbridge controller 112 may be replaced by a platform controller hub (PCH) and connected directly to host processor 102 via a direct media interface (DMI). Southbridge controller/PCH 112 handles I/O operations for the IHS, and thus, may include a variety of communication interfaces and ports for communicating with various system components, such as PCIe device(s) 114, input/output (I/O) devices 116, network interface card (NIC) 118, expansion bus(es) 120, computer readable storage medium 130, and computer readable NV memory 140.

Examples of communication interfaces and ports that may be included within southbridge controller/PCH 112 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit (I²C) interface, a Universal Serial Bus (USB) interface and a Thunderbolt™ interface. Examples of expansion bus(es) 120 that may be coupled to southbridge controller/PCH 112 include, but are not limited to, a PCI bus, a PCIe bus, a SATA bus, a USB bus, etc.

PCIe devices 114 may generally include PCI-to-PCI bridges and PCIe end devices that are connected via PCIe links to northbridge 104 and/or southbridge/PCH 112. Examples of PCIe end devices include, but are not limited to, PCIe video cards, sound cards, small system computer interface (SCSI) controllers, hardware RAID controllers, SSDs, NICs, GPUs, serial/parallel port cards, IEEE 1394 cards, Thunderbolt cards, USB controller cards, etc.

I/O devices 116 enable a user to interact with IHS 100. In some embodiments, one or more I/O devices 116 may be present within, or coupled to, IHS 100. In some embodiments, I/O device(s) 116 may be separate from the IHS and may interact with the IHS through a wired or wireless connection. Examples of I/O devices 116 include, but are not limited to, keyboards, keypads, touch screens, scanning devices, voice or optical recognition devices, and any other devices suitable for entering or retrieving data.

NIC 118 enables IHS 100 to communicate with one or more remote devices, systems and/or services via an external network using one or more communication protocols. The external network may be a local area network (LAN), wide area network (WAN), personal area network (PAN), or the like, and the connection to and/or between IHS 100 and the network may be wired, wireless or a combination thereof.

NIC 118 may communicate data and signals to/from IHS 100 using any known communication protocol. In some embodiments, NIC 118 may be implemented as a PCIe device, which communicates with PCH 112 via a PCIe link.

Computer readable storage medium 130 may be any type of persistent, non-transitory computer readable storage medium, such as one or more hard disk drives (HDDs) or solid-state drives (SSDs), and may be generally configured to store software and/or data. In some embodiments, computer readable storage medium 130 may store an operating system (OS) 132 for the IHS, in addition to one or more user applications and data. OS 132 may generally contain program instructions (or computer program code), which may be executed by host processor 102 to perform various tasks and functions for the information handling system and/or for the user. In some embodiments, computer readable storage medium 130 may be implemented as a PCIe-SSD, which communicates with PCH 112 via a PCIe link.

Computer readable memory 140 may include any type of non-volatile (NV) memory including, but not limited to, read-only memory (ROM), flash memory, and non-volatile random access memory (NVRAM), and may be generally configured to store software and/or firmware modules. The software and/or firmware modules stored within computer readable NV memory 140 may generally contain program instructions (or computer program code), which may be executed by host processor 102 to instruct components of IHS 100 to perform various tasks and functions for the information handling system. As shown in FIG. 1, for example, NV memory 140 may store boot firmware (FW) 142, Advanced Configuration and Power Interface (ACPI) firmware, and system management mode (SMM) code 146 in addition to other software and/or firmware modules.

Boot firmware 142 includes software and/or firmware modules for specifying hardware configuration settings, system date/time and boot sequence, etc. In some embodiments, boot firmware 142 may be implemented as a Basic Input/Output System (BIOS) and/or a Unified Extensible Firmware Interface (UEFI). When IHS 100 is initially powered on or rebooted, program instructions within boot firmware 142 may be executed by host processor 102 to configure hardware components of the IHS, perform a Power-On Self-Test (POST) to ensure the hardware configuration is valid and working properly, discover and initialize devices and launch a bootloader to load OS 132. Once launched, the bootloader within boot firmware 142 retrieves OS 132 from computer readable storage medium 130 and loads it into system memory 110.

As known in the art, boot firmware 142 may generally include boot services and runtime services. Boot services are available for execution when boot firmware 142 owns the system platform during a pre-boot phase of the boot firmware before OS 132 is loaded and running. Examples of boot services typically provided within boot firmware 142 include, but are not limited to, text and graphical consoles, and bus, block and file services. Runtime services, on the other hand, are available for execution while the OS is running (i.e., during OS runtime). Examples of runtime services typically provided within boot firmware 142 include, but are not limited to, date/time configuration settings and access to memory components. In addition to those typically provided, boot firmware 142 includes additional boot services and/or runtime services, which may be executable to perform various steps of the methods disclosed herein, as described in more detail below.

ACPI firmware 144 serves as an interface layer between boot firmware 142 and OS 132, and provides OS-independent interfaces between the platform hardware and OS-specific technologies, interfaces and code. ACPI firmware 144 includes ACPI tables, ACPI BIOS and ACPI registers. During the pre-boot phase of boot firmware 142, ACPI firmware 144 communicates available hardware components and their functions to OS 132 using methods provided by boot firmware 142, and constructs all ACPI tables and populates the interfaces and handlers to be used during OS runtime. ACPI tables are used during OS runtime to provide ACPI runtime services to OS 132, such as power management, thermal management and status monitoring functions.

As noted above, the ACPI specification defines six sleep "Sx" states and five device "Dx" states that can be used to reduce power consumption within an IHS. The six sleep "Sx" states applied to the system platform include S0-S5. In the S0 (working) state, the system is awake and running. In sleep states S1-S3, power is maintained to system memory, yet removed from other IHS components to conserve power. In the S4 (hibernate) state, the system appears to be off and power consumption is reduced to the lowest level. In the S5 (soft off) state, the system is shutdown, usually in response to a system restart.

The five device states applied to devices include D0-D3. In the D0 (working) state, the device is fully on and running. D1, D2 and D3 are low power states, which are device dependent. While some ACPI-compliant devices may support all low power states (D1-D3), others may only support D0 and one low power state (e.g., D3). The power state of a device need not match the system power state or even the power state of the device's parent bus. For example, power savings can be obtained by transitioning inactive devices to a D3 state even though the system is in the S0 (working) state.

In some embodiments, OS 132 may use the ACPI Device Power Management features of ACPI firmware 144 to manage power state transitions for IHS components and peripheral devices that are not integrated into the host processor SoC. For ACPI-managed devices, the power policy owner in a device driver stack (typically the function or class driver) makes device power state transition decisions, and the ACPI driver running in the OS invokes ASL control methods to apply the required platform-specific power controls. In some embodiments, for example, an ACPI driver running in OS 132 may invoke an ACPI wake method (called "_WAK") to transition the system platform from a lower power state (e.g., S1-S5) to a higher power state (e.g., S0). The ACPI wake method may, in turn, invoke an SMI handler to check for spurious resets of PCIe devices that may occur during the power state transition.

SMM program code 146 includes software and/or firmware modules for handling system events, managing system safety, and performing other power management and control operations. As known in the art, SMM program code 146 generally includes SMI functions and SMI handlers. Upon system startup, the SMI functions stored within SMM program code 146 are loaded into a region of system memory 110 during the IHS boot process. During OS runtime, an SMI handler may be invoked in response to a system management interrupt (SMI) to fetch SMI function(s) corresponding to the SMI from system memory 110. Once loaded, the SMI functions may be executed by host processor 102 to handle the SMI.

SMIs can be triggered by hardware or software interrupts. In some embodiments of the present disclosure, an SMI may be triggered periodically by southbridge controller/PCH 112 (or an embedded controller, if present) to determine whether or not a spurious reset has occurred for one or more PCIe devices. In other embodiments, an SMI may be triggered dynamically by a PCI-to-PCI bridge in response to a timeout error that occurs after a PCIe device connected to the bridge experiences a spurious reset. Once an SMI is triggered, an SMI handler is invoked to load a corresponding SMI function stored within the SMM code region of system memory 110 into host processor 102. The SMI function may be executed by host processor 102 to detect and/or recover from a spurious reset of a PCIe device, as described in more detail below.

Figure 2:
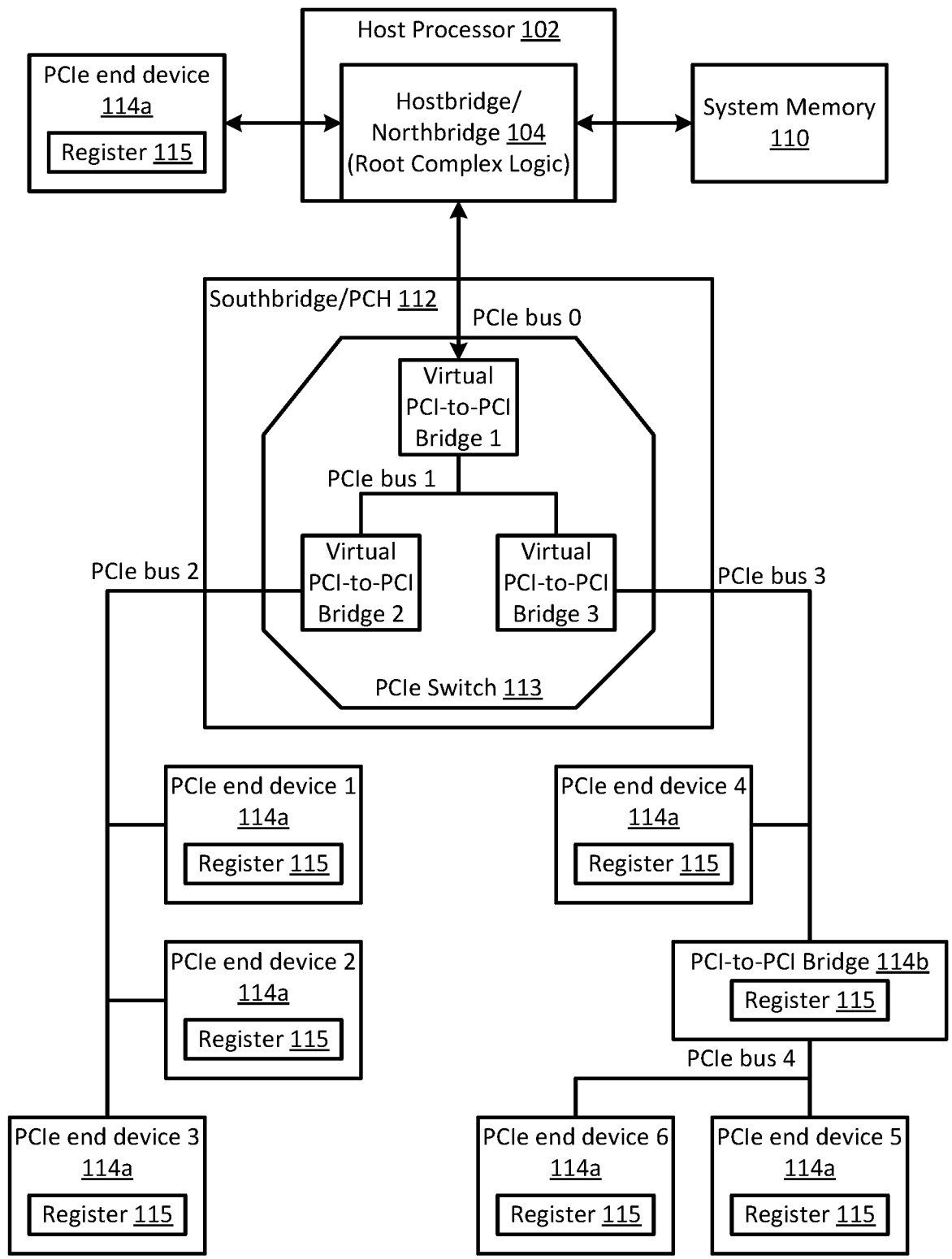
FIG. 2 is a block diagram illustrating an example hierarchy of PCIe devices, including a PCIe root complex, PCI switch, PCI-to-PCI bridge(s) and PCIe end devices.

FIG. 2 is a block diagram illustrating an example hierarchy of PCIe devices that may be included within an information handling system, such as IHS 100. As shown in FIG. 2, different types of PCIe devices—including a PCIe root complex, a PCI switch, PCI-to-PCI bridge(s) and PCIe end devices—are coupled in a tree topology. The PCIe root complex logic may be implemented within northbridge controller 104, or integrated within the host processor 102 SoC, and is generally used to provide a high speed PCIe connection to a GPU (when the GPU is implemented as a PCIe device 114). The root complex connects to the PCIe device tree through a logical port known as the root port, which may be implemented, e.g., within southbridge/PCH 112.

A PCIe switch is a device that connects two or more PCIe links (or buses) and may contain several virtual PCI-to-PCI bridges. In the example shown in FIG. 2, PCIe switch 113 within southbridge controller/PCH 112 includes a first virtual PCI-to-PCI bridge 1 connecting a first PCIe link (PCIe bus 0) to a second PCIe link (PCIe bus 1), a second virtual PCI-to-PCI bridge 2 connecting the second PCIe link (PCIe bus 1) to a third PCIe link (PCIe bus 2), and a third virtual PCI-to-PCI bridge 3 connecting the second PCIe link (PCIe bus 1) to a fourth PCIe link (PCIe bus 3).

A PCIe end device is a PCIe device that terminates a PCIe link, i.e., it only has one connection to the PCIe tree topology. In the example shown in FIG. 2, three PCIe end devices 114*a* (1, 2, and 3) are coupled to the third PCIe link (PCIe bus 2), while one PCIe end device 114 (4) is coupled to the fourth PCIe link (PCIe bus 3). A PCI-to-PCI bridge 114*b* is included for connecting the fourth PCIe link (PCIe bus 3) to a fifth PCIe link (PCIe bus 4) to which two more PCIe end devices 114*a* (5 and 6) are connected.

As shown in FIG. 2, each PCIe device (e.g., PCIe end devices 114*a* and PCI-to-PCI bridge 114*b*) includes a set of PCIe configuration registers 115 for storing configuration settings for the device. Although not illustrated herein, PCIe configuration registers 115 may also be included within GPU 106, NIC 118 and/or computer readable storage medium 130 when these devices are implemented as PCIe devices. According to the PCIe specification, PCI-to-PCI bridge devices are required to implement a PCI configuration register Type 1 header, while other PCI devices implement the PCI configuration register Type 0 header.

FIG. 3 is a block diagram illustrating a set of PCIe configuration registers 115 (Type 0 header), which may be included within a PCIe end device 114*a* to specify configuration settings for the PCIe end device. According to the PCIe specification, all PCIe devices must support the Vendor ID, Device ID, Command and Status, Revision ID, Class Code, Header Type, Base Address Registers (BARs) and Capabilities Pointer fields. The Capabilities Pointer field points to the start of a PCIe capabilities register set, which includes a device capabilities register (including device state and device control fields) and a link capabilities register (including link state and link control fields), among other registers. Implementation of the other registers is optional, depending upon the devices functionality. Additional details of the PCIe configuration registers 115 may be obtained from the PCIe Base Specification, which can be found on the PCI-SIG website (https://pcisig.com/specifications) and is incorporated herein in its entirety.

During the pre-boot phase, boot firmware 142 may be executed to detect and enumerate all PCIe devices (e.g., PCIe end devices 114a, PCI-to-PCI bridge 114b, GPU 106, NIC 118 and/or computer readable storage medium 130) included within IHS 100 by reading the Vendor ID and Device ID registers for each combination of PCIe bus number (e.g., PCIe bus 0 . . . 4 in FIG. 2) and device number (i.e., the PCIe device's sequential number on a given bus). If the read is successful for a given PCIe device, boot firmware 142 may be executed to map the PCI device memory to system memory 110 and write the memory mapped and I/O port addresses into the BARs of the PCIe configuration registers 115 of that device. These addresses typically remain valid as long as the IHS remains powered on.

A variety of power management techniques can be used to reduce the amount of power consumed within PCIe devices and PCIe links. For example, the ACPI Device Power Management features of ACPI firmware 144 can be used to transition PCIe devices to lower-power device states (e.g., D1-D3) during periods of device inactivity. In addition, Active State Power Management (ASPM) can be used to reduce power consumption in the PCIe links coupled to a PCIe device by transitioning the links to lower-power link states (e.g., L0s, L1, L2, L3). As known in the art, ASPM support can be enabled/disabled in a PCIe device by applying the appropriate settings in the link control field of the PCIe capabilities register set stored within the PCIe device and it's associated bridge (if connected via a bridge).

In some cases, however, a PCIe device may fail to transition in and out of a lower power state correctly when ASPM is enabled. When failures occur during power state transitions, the PCIe device is automatically reset (referred to as a "spurious reset") and the configuration settings stored within the PCIe configuration registers 115 of the device are reset to power-on default settings. Although the PCIe device is still present on the PCIe bus, the device driver running in the OS cannot access the device resources when the configuration settings are overwritten with power-on defaults. In some cases, a timeout error may occur when a device driver attempts to access a reset PCIe device, resulting in a system hang, Blue Screen of Death (BSOD) error and/or data loss. One common solution for preventing system hangs, BSOD errors, etc. that occur due to spurious resets of PCIe devices is to permanently disable ASPM support for the PCIe device. However, disabling ASPM increases power consumption, and thus, is not ideal in low power applications.

To overcome these problems, the present disclosure provides embodiments of an improved system and method to detect and recover from a spurious reset of a PCIe device before the spurious reset causes a system hang or BSOD error. If a spurious reset is detected for a PCIe device, the system and method disclosed herein restores the PCIe device to a functional state (so that its driver can resume normal operation) and temporarily disables ASPM support for the restored PCIe device. Unlike the conventional solution mentioned above, ASPM support is disabled only temporarily, and is re-enabled for the PCIe device at the next system reboot. The temporary disablement of ASPM prevents subsequent PCIe resets during the current operating cycle (e.g., while the user performs the same tasks that may have caused the spurious reset) before recapturing power savings for the device at the next system reboot.

Figure 4:
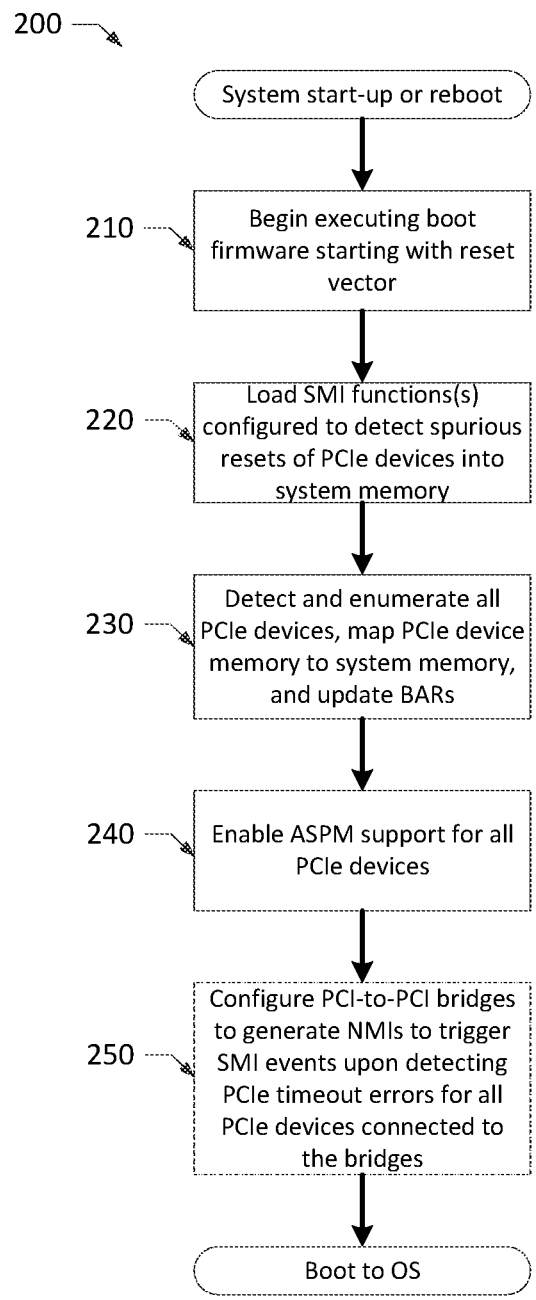
FIG. 4 is a flowchart diagram illustrating one embodiment of method steps that may be performed by a processing device during an IHS boot process to detect and enumerate PCIe devices, enable ASPM support for the PCIe devices, and load SMI functions configured to detect spurious resets of the PCIe devices into system memory.
Figure 5:
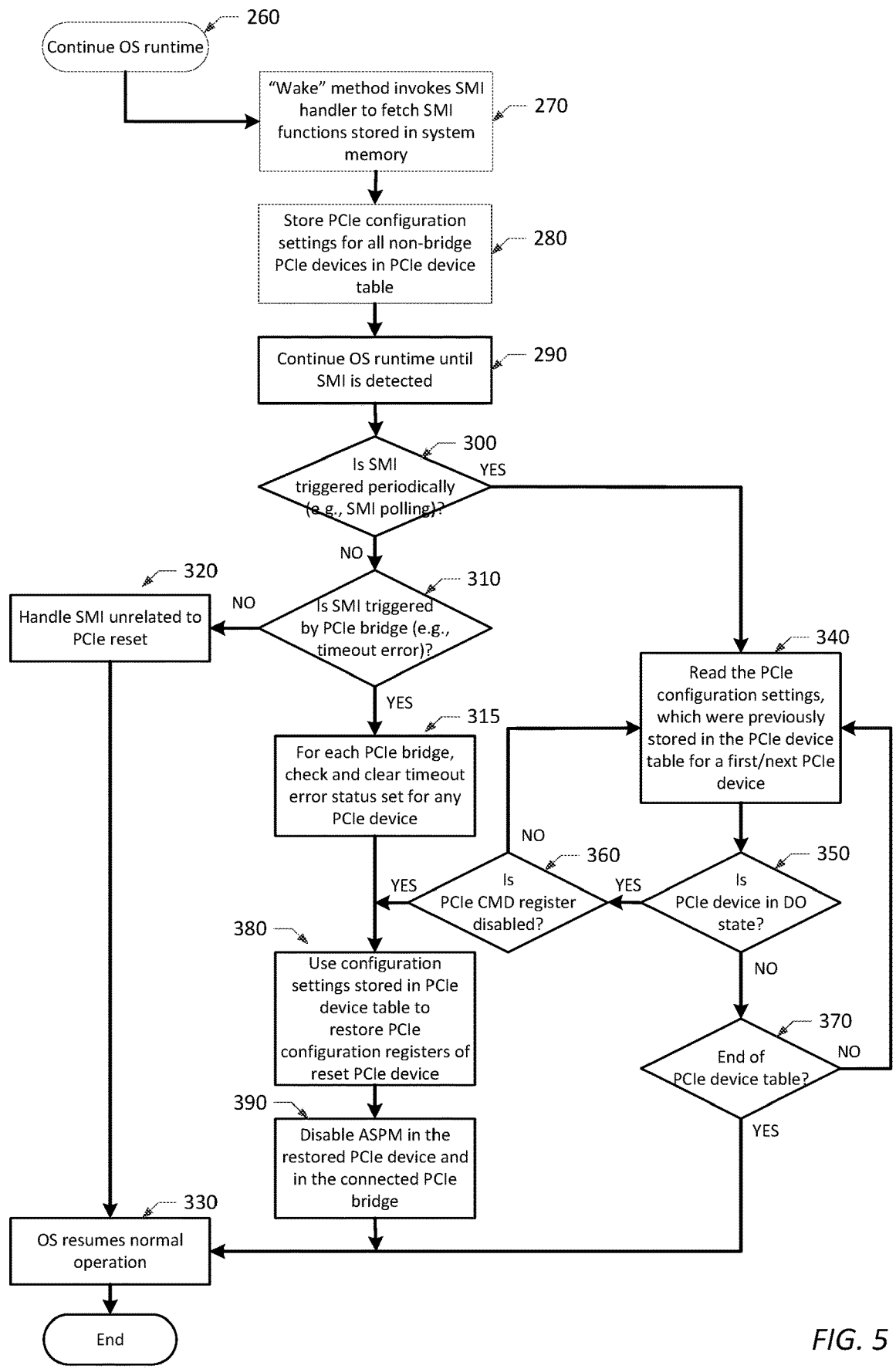
FIG. 5 is a flowchart diagram illustrating one embodiment of method steps that may be performed by a processing device during OS runtime to detect a spurious reset of at least one PCIe device, restore the reset PCIe device(s) to a functional state, and temporarily disable ASPM support for the restored PCIe device(s)

In general, the method disclosed herein may be implemented by at least one processing device of an information handling system executing program instructions during an IHS boot process and during OS runtime. FIG. 4, for example, illustrates method steps that may be performed by a processing device during an IHS boot process to detect and enumerate PCIe devices, enable ASPM support for the PCIe devices, and load SMI functions configured to detect spurious resets of the PCIe devices into system memory. FIG. 5 illustrates method steps that may be performed by a processing device during OS runtime to detect a spurious reset of at least one PCIe device, restore the reset PCIe device(s) to a functional state, and temporarily disable ASPM support for the restored PCIe device(s).

As shown, the method shown in FIGS. 4 and 5 represents a computer implemented method 200, which is performed by hardware, software and/or firmware components of an information handling system. In some embodiments, host processor 102 may execute program instructions to implement the method shown in FIGS. 4 and 5. For example, host processor 102 may execute boot services of boot firmware 142 to perform the method steps shown in FIG. 4, and runtime services of boot firmware 142 and SMM program code 146 to perform the method steps shown in FIG. 5. It is noted, however, that the computer implemented method shown in FIGS. 4 and 5 is not strictly limited to such an embodiment, and can be implemented by another IHS processing device (e.g., an embedded controller, microcontroller, or another processing device) executing other program instructions, in other embodiments.

The computer implemented method shown in FIGS. 4 and 5 improves how the information handling system functions, in at least some respects, by detecting spurious resets of PCIe device(s), restoring a reset PCIe device to a functional state (so that its driver can resume normal operation), and dynamically disabling ASPM support for the restored PCIe device until the next system reboot. As described in more detail below, a reset PCIe device may be restored to a functional state by restoring the configuration settings that were stored within the PCIe configuration registers 115 of the reset PCIe device before they were overwritten with power-on default settings. This enables the device driver to access the resources of the restored PCIe device and prevents a BSOD 0x9F (Timeout Waiting for IRP to Complete) error that would otherwise have occurred, if power-on default settings were maintained within the PCI configuration register 115 of the reset PCIe device.

According to one embodiment, method 200 may begin in FIG. 4 when an information handling system (such as IHS 100) is powered on or rebooted to begin an IHS boot process. When the IHS is powered on or rebooted, an IHS processing device (e.g., host processor 102) begins executing boot firmware, starting with the reset vector (in step 210), and loads SMI functions into system memory (in step 220). In the present disclosure, at least one of the SMI functions loaded into system memory in step 220 may be configured to detect spurious resets of PCIe devices. As described in more detail below, the SMI functions loaded into system memory in step 220 may be executed by the processing device to handle SMI events that occur during OS runtime.

In step 230, method 200 detects and enumerates all PCIe devices included within the information handling system, maps the PCIe device memory of all detected devices to system memory, and updates the BARs within the PCIe configuration registers of the detected devices. As known in the art, PCIe devices may be detected and enumerated by reading the Vendor ID and Device ID within the PCIe configuration registers 115 stored within the PCIe devices for each combination of PCIe bus number and device number on a given bus. If the read is successful for a given PCIe device, the PCI device memory is mapped to system memory, and the memory mapped and I/O port addresses are written into the BARs of the PCI configuration register 115 of that device in step 230.

In step 240, method 200 enables ASPM support for one or more PCIe devices. As noted above, ASPM support can be enabled by applying the appropriate settings in the link control register of the PCIe capabilities register set stored within a PCIe device. In some embodiments, ASPM support may be enabled for all PCIe devices detected and enumerated in step 230. In other embodiments, ASPM support may be re-enabled in step 240 for only the PCIe devices in which ASPM support was disabled in a previous operating cycle. In some embodiments, method 200 may boot to the OS after enabling ASPM support (in step 240).

In other embodiments, one or more additional steps may be performed before booting the OS. For example, most PCIe device drivers have a window or specified time period (e.g., 300 seconds) during which the driver may wait for a PCIe device to respond before a timeout error occurs. The BSOD 0x9F (Timeout Waiting for IRP to Complete) is one example of a timeout error that may occur if a PCIe device does not respond within the specified time period. In some embodiments, method 200 may configure each PCI-to-PCI bridge included within the IHS to generate a non-maskable interrupt (NMI) upon detecting a timeout error for an attached PCIe device (in optional step 250). By configuring a PCI-to-PCI bridge to generate an NMI when a PCIe timeout error occurs, and configuring the NMI to trigger an SMI event, optional step 250 enables the OS runtime method shown in FIG. 5 to respond dynamically to PCIe device resets without waiting for an SMI polling event.

After booting to the OS, normal OS runtime behavior may continue in step 260 of FIG. 5 until a wake method is called to transition the system from a lower power state to a higher power state. In one embodiment, the wake method may be an ACPI wake ("_WAK") method, which is called by the OS ACPI driver whenever the system platform transitions from a lower power state (e.g., S1-S5) to a working state (e.g., S0). When a wake method is called, an SMI handler is invoked (in step 270) to fetch the SMI function(s) from system memory that are configured to detect spurious resets of PCIe devices.

In some embodiments, other interceptable events that occur early in the OS boot process may be used, in lieu of a wake method, to invoke an SMI handler (in step 270). As used herein, an "interceptable event" may refer to any boot firmware code that is expected to be triggered by an SMI or by the OS during the OS boot process. The ACPI wake ("_WAK") method is the first interceptable event that occurs when an ACPI operating system is booted. Other interceptable events that occur after the ACPI wake method is called can also be used to invoke the SMI handler (in step 270). For example, a polled SMI could act as an interceptable event that invokes an SMI handler. Examples of other interceptable events that may be used to invoke an SMI handler include, but are not limited to, events that occur when the operating system initializes battery capacity and when ACPI initializes an ASL variable.

Figure 6:
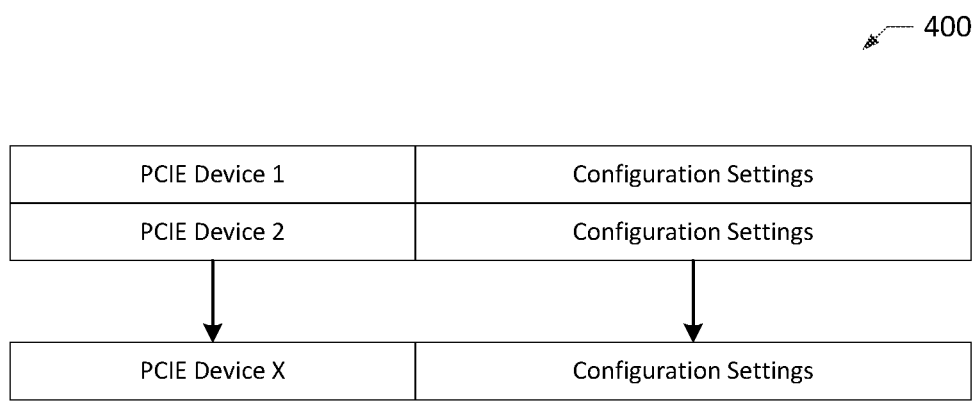
FIG. 6 is a block diagram of a PCIe device table containing configuration settings for a plurality of PCIe devices included within an IHS.

In addition to fetching the appropriate SMI function(s), the SMI handler reads the configuration settings (e.g., BARs, link settings, etc.) stored within the PCIe configuration registers 115 of all non-bridge PCIe devices and stores the read configuration settings within a PCIe device table (in step 280). In one embodiment, the PCIe device table 400 (shown in FIG. 6) may be stored in System Management Mode (SMM) memory or Runtime Services memory. Once the PCIe device table is generated and stored (in step 280), OS runtime may continue until a system management interrupt (SMI) is detected (in step 290).

In the present disclosure, an SMI may be: (a) triggered periodically via SMI polling to determine whether or not a spurious reset has occurred for one or more PCIe devices, (b) triggered dynamically by a PCI-to-PCI bridge in response to a timeout error that occurs in a PCIe device connected to the bridge, or (c) triggered for some other reason unrelated to PCIe resets. When an SMI is detected (in step 290), the method shown in FIG. 5 determines whether the SMI is triggered periodically via SMI polling (in step 300) or triggered dynamically by a PCI-to-PCI bridge (in step 310). If the SMI detected in step 290 is not triggered periodically or dynamically by a PCI-to-PCI bridge (NO branches of steps 300 and 310), the method concludes that the SMI is unrelated to a PCIe reset (in step 320) and the OS resumes normal operation (in step 330).

In some embodiments, the SMI detected in step 290 may be generated periodically via SMI polling. In one example, an SMI polling event may be generated at least once every 300 seconds (or less) to enable the method show in FIG. 5 to check for spurious resets of PCIe devices. If the SMI detected in step 290 is triggered periodically via SMI polling (YES branch of step 300), method steps 340-370 may be performed to determine whether or not a spurious reset has occurred for at least one PCIe device. If a spurious reset is detected in steps 340-370, method steps 380-390 may be performed to restore any reset PCIe device(s) to a functional state and to temporarily disable ASPM support for any restored PCIe device(s).

To determine whether or not a spurious reset has occurred, the method shown in FIG. 5 may read the PCIe configuration settings stored for a first PCIe device in the PCIe device table (in step 340) to determine: (a) if the PCIe device is in a working (i.e., D0) state (in step 350), and (b) if the command (CMD) register is disabled (in step 360). If the first PCIe device not in a working state (NO branch of step 350), the method checks to make sure the PCIe device is not the last PCIe device listed in the PCIe device table (in step 370) before reading the PCIe configuration settings stored for the next PCIe device in the PCIe device table (in step 340).

A spurious reset may be detected for a particular PCIe device, if the method determines that the PCIe command (CMD) register for the PCIe device is disabled (YES branch of step 360) while the PCIe device is in a working state (YES branch of step 350). When a spurious reset is detected for a particular PCIe device (YES branch of step 360), the method shown in FIG. 5 uses the configuration settings stored within the PCIe device table (in step 280) to restore the PCIe configuration registers 115 of the reset PCIe device (in step 380), and disables ASPM support for the restored PCIe device (in step 390). If the PCIe device is connected via a PCI-to-PCI bridge (such as, e.g., PCIe end devices 5 and 6 connected to PCI-to-PCI bridge 113 of FIG. 2), ASPM support for the PCIe device may also be disabled in the PCI-to-PCI bridge (in step 370).

As described above with respect to FIG. 4, the PCI-to-PCI bridges of the IHS may be configured during an IHS boot process (in optional step 250) to generate non-maskable interrupts (NMIs), which trigger SMI events upon detecting PCIe timeout errors in the PCIe devices connected to the bridges. As noted above, a timeout error (e.g., a BSOD 0x9F: Timeout Waiting for IRP to Complete error) may occur in a PCIe device when the device fails to respond to its device driver within the specified time period (e.g., 300 seconds).

In some embodiments, the SMI detected in step 290 may be triggered dynamically by a PCI-to-PCI bridge in response to a timeout error that occurs in a PCIe device connected to the bridge. If method 200 determines that the SMI was triggered by a timeout error (YES branch of step 310), the method may check each PCI-to-PCI bridge (in step 315) to locate the PCIe device that was reset due to a timeout error. In particular, the method may check each PCI-to-PCI bridge (in step 315) to determine if a PCIe timeout error status has been set in the bridge for at least one PCIe device. If a PCIe timeout error status is set in a PCI-to-PCI bridge (indicating that a timeout error has occurred in a connected PCIe device), the reset PCIe device is located and the PCIe timeout error status is cleared in the bridge (in step 315). Once the reset PCIe device is located, method steps 380-390 are performed to restore the reset PCIe device to a functional state and to temporarily disable ASPM support for the restored PCIe device, as set forth above.

ASPM support can be disabled in step 390 by applying the appropriate settings in the link control register of the PCIe capabilities register set stored within the restored PCIe device (and it's associated bridge). Unlike conventional solutions, the method shown in FIGS. 4 and 5 disables ASPM support only temporarily and re-enables ASPM support for the restored PCIe device on the next system reboot (e.g., in step 240 of FIG. 4). This prevents subsequent PCIe device resets during the current operating cycle (e.g., while the user performs the same tasks that may have caused the reset), while enabling the device to recapture power savings at the next system reboot.

It will be understood that one or more of the tasks, functions, or methodologies described herein may be implemented, for example, as firmware or as a computer program of instructions embodied in a non-transitory tangible computer readable medium that is executed by a CPU, embedded controller, microcontroller, processor, microprocessor, FPGA, ASIC, or other suitable processing device. In one embodiment, for example, the methods shown in FIGS. 4 and 5 may be implemented as computer program instructions, which are stored within non-volatile computer readable memory 140 and executed by host processor 102 of information handling system 100.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A computer-implemented method executed by a host processor of an information handling system (IHS) comprising a plurality of Peripheral Component Interconnect Express (PCIe) devices, each PCIe device comprising PCIe configuration registers containing configuration settings for the PCIe device, wherein the computer-implemented method comprises:
   generating a PCIe device table in response to the IHS transitioning from a lower power state to a higher power state, wherein said generating comprises:
      reading the configuration settings stored within the PCIe configuration registers of each of the plurality of PCIe devices; and
      storing the read configuration settings within the PCIe device table;
   determining, in response to detecting a system management interrupt (SMI), whether or not a spurious reset has occurred for at least one PCIe device of the plurality of PCIe devices, wherein a spurious reset occurs when the at least one PCIe device is automatically reset and the configuration settings stored within the PCIe configuration registers of the at least one PCIe device are reset to power-on default settings; and
   wherein upon determining that a spurious reset has occurred for the at least one PCIe device, the computer-implemented method further comprises:
      recovering the at least one PCIe device, wherein said recovering comprises using the configuration setting, which were previously stored within the PCIe device table for the at least one PCIe device, to overwrite the power-on default settings and restore the configuration setting stored within the PCIe configuration registers included within the at least one PCIe device; and
      temporarily disabling Active State Power Management (ASPM) support for the at least one PCIe device until the IHS is rebooted.

2. The computer-implemented method as recited in claim 1, wherein prior to said determining, the computer-implemented method further comprises detecting an SMI that is triggered when a timeout error occurs in a particular PCIe device.

3. The computer-implemented method as recited in claim 2, wherein said determining comprises determining that a spurious reset has occurred for the particular PCIe device when the SMI is detected.

4. The computer-implemented method as recited in claim 1, wherein prior to said determining, the computer-implemented method further comprises detecting an SMI that is triggered periodically via SMI polling.

5. The computer-implemented method as recited in claim 1, further comprising re-enabling ASPM support for the at least one PCIe device on a subsequent reboot of the information handling system.

6. The computer-implemented method as recited in claim 1, further comprising storing the PCIe device table in a computer readable non-volatile memory of the IHS.

7. A computer-implemented method executed by a host processor of an information handling system comprising a plurality of Peripheral Component Interconnect Express (PCIe) devices, each PCIe device comprising a set of PCIe configuration registers containing configuration settings for the PCIe device, wherein the computer-implemented method comprises:
   generating, in response to the IHS transitioning from a lower power state to a higher power state, a PCIe device table containing the configuration settings stored within the set of PCIe configuration registers for each of the PCIe devices;

determining, in response to detecting a system management interrupt (SMI), whether or not a spurious reset has occurred for at least one of the PCIe devices; and recovering the at least one PCIe device if said determining indicates that a spurious reset has occurred for the at least one PCIe device;

wherein prior to said determining, the computer-implemented method further comprises detecting an SMI that is triggered periodically via SMI polling; and wherein said determining comprises:
  reading the configuration settings stored within the PCIe device table for each PCIe device, and
  determining that a spurious reset has occurred for at least one PCIe device if the configuration settings stored within the PCIe device table for the at least one PCIe device indicate that a command register is disabled when the at least one PCIe device is in a working state.

8. An information handling system (IHS), comprising:
a plurality of Peripheral Component Interconnect Express (PCIe) devices, each comprising PCIe configuration registers containing configuration settings for the PCIe device;
a host processor coupled to the PCIe devices and configured to execute:
  a first set of program instructions in response to the IHS transitioning from a lower power state to a higher power state, wherein the first set of program instructions are executed to generate a PCIe device table by reading the configuration settings stored within the PCIe configuration registers of each of the plurality of PCIe devices and storing the read configuration settings within the PCIe device table;
  a second set of program instructions in response to detecting a system management interrupt (SMI), wherein the second set of program instructions are executed to determine if a spurious reset has occurred for at least one PCIe device of the plurality of PCIe devices, wherein a spurious reset occurs when the at least one PCIe device is automatically reset and the configuration settings stored within the PCIe configuration registers of the at least one PCIe device are reset to power-on default settings;
  wherein in response to the second set of program instructions determining that a spurious reset has occurred for the at least one PCIe device, the host processor is further configured to execute:
    a third set of program instructions to recover the at least one PCIe device by using the configuration settings, which were previously stored within the PCIe device table for the at least one PCIe device, to overwrite the power-on default settings and restore the configuration settings stored within the PCIe configuration registers included within the at least one PCIe device; and
    a fourth set of program instructions to temporarily disable Active State Power Management (ASPM) support for the at least one PCIe device until the IHS is rebooted.

9. The information handling system as recited in claim 8, wherein the first set of program instructions are executed by the host processor whenever a system platform of the IHS transitions from an S1-S5 state to an S0 state.

10. The information handling system as recited in claim 8, wherein the first set of program instructions are executed by the host processor in response to an interceptable event that occurs when an operating system of the IHS is booted.

11. The information handling system as recited in claim 8, wherein the second set of program instructions executed by the host processor determine that a spurious reset has occurred for a particular PCIe device if the SMI is triggered in response to a timeout error that occurs in the particular PCIe device.

12. The information handling system as recited in claim 11, wherein the plurality of PCIe devices comprise at least one PCI-to-PCI bridge, and wherein the SMI is triggered by a non-maskable interrupt (NMI), which is generated by the at least one PCI-to-PCI bridge when a timeout error occurs in a PCIe device connected to the at least one PCI-to-PCI bridge.

13. The information handling system as recited in claim 8, wherein the host processor is further configured to execute a fifth set of program instructions to re-enable ASPM support for the at least one PCIe device on a subsequent reboot of the information handling system.

14. The information handling system as recited in claim 13, wherein the first, second, third, fourth and fifth program instructions are included within boot firmware and System Management Mode (SMM) program code, which is stored within a computer readable non-volatile (NV) memory of the information handling system.

15. The information handling system as recited in claim 8, further comprising a computer readable non-volatile memory coupled to the host processor, wherein the PCIe device table is stored within the computer readable non-volatile memory.

16. The information handling system as recited in claim 15, wherein the PCIe device table is stored within a System Management Mode (SMM) memory location or a runtime services memory location of the computer readable non-volatile memory.

17. An information handling system (IHS), comprising:
a plurality of Peripheral Component Interconnect Express (PCIe) devices, each comprising a set of PCIe configuration registers containing configuration settings for the PCIe device;
a host processor coupled to the PCIe devices and configured to execute:
  a first set of program instructions in response to the IHS transitioning from a lower power state to a higher power state, wherein the first set of program instructions are executed to generate a PCIe device table containing the configuration settings stored within the PCIe configuration registers for each of the plurality of PCIe devices;
  a second set of program instructions in response to detecting a system management interrupt (SMI), wherein the second set of program instructions are executed to determine if a spurious reset has occurred for at least one of the PCIe devices; and
  a third set of program instructions to recover the at least one PCIe device if the second set of program instructions determine that a spurious reset has occurred for the at least one PCIe device;
  wherein the second set of program instructions are executed by the host processor to:
    read the configuration settings stored within the PCIe device table for each PCIe device, and
    determine that a spurious reset has occurred for at least one PCIe device if the configuration settings stored within the PCIe device table for the at least one PCIe device indicate that a command register is disabled when the at least one PCIe device is in a working state.

18. The information handling system as recited in claim 17, wherein the second set of program instructions are executed by the host processor in response to an SMI that is triggered periodically via SMI polling.

\* \* \* \* \*